United States Patent
Sharavanan et al.

(10) Patent No.: US 8,426,023 B2
(45) Date of Patent: Apr. 23, 2013

(54) COATED POLYOXYMETHYLENES COMPRISING A FORMALDEHYDE SCAVENGER COMPRISING A LYSINE COMPOUND

(75) Inventors: Karthikeyan Sharavanan, Mannheim (DE); Jens Assmann, Mannheim (DE); Lidcay Herrera Taboada, Barcelona (EP); Rainer Anderlik, Heidelberg (DE)

(73) Assignee: BASF SE (DE)

( * ) Notice: Subject to any disclaimer, the term of this patent is extended or adjusted under 35 U.S.C. 154(b) by 300 days.

(21) Appl. No.: 12/867,117

(22) PCT Filed: Feb. 5, 2009

(86) PCT No.: PCT/EP2009/051324
§ 371 (c)(1),
(2), (4) Date: Aug. 11, 2010

(87) PCT Pub. No.: WO2009/101028
PCT Pub. Date: Aug. 20, 2009

(65) Prior Publication Data
US 2010/0316865 A1    Dec. 16, 2010

(30) Foreign Application Priority Data
Feb. 13, 2008 (EP) .................................. 08101577

(51) Int. Cl.
*B32B 5/16* (2006.01)
*C09D 151/06* (2006.01)
*C08K 5/07* (2006.01)
*C08K 5/10* (2006.01)
*C08K 5/16* (2006.01)
*C08K 5/20* (2006.01)

(52) U.S. Cl.
USPC ........... 428/407; 523/201; 523/202; 523/208; 524/714; 524/724

(58) Field of Classification Search .................. 428/403, 428/407; 524/714, 724; 523/201, 202, 208
See application file for complete search history.

(56) References Cited

U.S. PATENT DOCUMENTS

| 3,102,106 | A | * | 8/1963 | Regan ............................ 524/172 |
| 3,960,984 | A | | 6/1976 | Kohan |
| 6,753,363 | B1 | * | 6/2004 | Harashina ....................... 524/99 |
| 7,098,262 | B2 | * | 8/2006 | Kim et al. ...................... 524/310 |
| 8,029,912 | B2 | * | 10/2011 | Sharavanan et al. .......... 428/524 |
| 8,128,845 | B2 | * | 3/2012 | Moraczewski et al. ........ 252/511 |
| 8,158,571 | B2 | * | 4/2012 | Alonso et al. .................. 510/441 |
| 2001/0018489 | A1 | * | 8/2001 | Angel et al. ..................... 525/74 |
| 2007/0191256 | A1 | * | 8/2007 | Fossum et al. ................. 510/515 |
| 2010/0291389 | A1 | * | 11/2010 | Sharavanan et al. .......... 428/407 |

FOREIGN PATENT DOCUMENTS

| DE | 1 077 430 | 3/1960 |
| DE | 25 40 207 | 11/1976 |
| EP | 219048 | 4/1987 |
| EP | 1125954 A2 | 8/2001 |
| EP | 1522554 A1 | 4/2005 |
| EP | 1595918 A1 | 11/2005 |
| EP | 1637557 | 3/2006 |
| EP | 1674526 A1 | 6/2006 |
| EP | 1683838 A1 | 7/2006 |
| JP | 02-129218 | 5/1990 |
| JP | 04-345648 | 12/1992 |
| JP | 06-80619 | 3/1994 |
| JP | 11-140272 | 5/1999 |
| JP | 2002-35098 | 2/2002 |
| JP | 2004-169027 | 6/2004 |

OTHER PUBLICATIONS

English-language translation of the Preliminary Report on Patentability mailed in International Application No. PCT/EP2009/051324 on Nov. 25, 2010.

* cited by examiner

*Primary Examiner* — Hoa (Holly) Le
(74) *Attorney, Agent, or Firm* — Novak Druce Connolly Bove + Quigg LLP

(57) ABSTRACT

The present invention relates to coated polyoxymethylene moldings, comprising at least one polyoxymethylene homo- or copolymer A), and also, if appropriate, further additives B), which has been coated on the surface with at least one binder C) and one formaldehyde scavenger D), wherein the binder C) used comprises a polyalkylene oxide $C_1$ or a polyvinyl ester $C_2$ or a graft polymer $C_3$ composed of $C_1$ and $C_2$ or a mixture of these, and the formaldehyde scavenger D) used comprises at least one lysine compound.

20 Claims, No Drawings

COATED POLYOXYMETHYLENES COMPRISING A FORMALDEHYDE SCAVENGER COMPRISING A LYSINE COMPOUND

CROSS REFERENCE TO RELATED APPLICATIONS

This application is a national stage application under 35 U.S.C. §371 of PCT/EP2009/051324, filed Feb. 5, 2009, which claims benefit to European application 08101577.8, filed Feb. 13, 2008, the entire disclosures of which are hereby incorporated by reference.

The invention relates to coated polyoxymethylene moldings, comprising at least one polyoxymethylene homo- or copolymer A), and also, if appropriate, further additives B), which has been coated on the surface with at least one binder C) and one formaldehyde scavenger D), wherein the binder C) used comprises a polyalkylene oxide $C_1$ or a polyvinyl ester $C_2$ or a graft polymer $C_3$ composed of $C_1$ and $C_2$ or a mixture of these, and the formaldehyde scavenger D) used comprises at least one lysine compound.

The invention further relates to a process for the production of these coated polyoxymethylene moldings of any type.

Polyoxymethylenes which have low formaldehyde emission are relevant for many applications, in particular for automobile applications.

Examples of formaldehyde scavengers are zeolites, which absorb FA (formaldehyde) physically.

Other formaldehyde scavengers are N-containing compounds, which react chemically with FA.

Amines, amino-substituted triazines and hydrazide components are disclosed by way of example in EP-A 16 37 557, EPA, 15 22 554, JP-A 11/140,272, JP-A 06/80619, JP-A 04/345 648, and JP 2002/35098. In all of the specifications mentioned, the FA scavenger is incorporated by way of what may be called a (secondary) further process. Since FA additives are consumed here by reaction even before the conventional devolatilization process is complete, relatively high contents of FA scavengers are needed in the molding compositions.

The presence of N-containing FA scavengers also mostly leads to yellow coloration effects in the polymer. The monomers produced during the devolatilization process cannot be returned to the polymerization process without purification, since N compounds present would disrupt the polymerization process.

It was therefore an object of the present invention to provide polyoxymethylenes with reduced FA emission which do not have the abovementioned disadvantages.

The coated POM moldings defined in the introduction have accordingly been found. A process has moreover been found for the production of the coated polyoxymethylenes.

Preferred embodiments are found in the subclaims.

The moldings according to the invention comprise, as component A), from 10 to 100% by weight, preferably from 30 to 98% by weight and in particular from 40 to 90% by weight, of a polyoxymethylene homo- or copolymer.

These polymers are known per se to the person skilled in the art and are described in the literature.

These polymers very generally have at least 50 mol % of —$CH_2O$— repeat units in the main polymer chain.

The homopolymers are generally prepared by polymerizing formaldehyde or trioxane, preferably in the presence of suitable catalysts.

For the purposes of the invention, component A is preferably polyoxymethylene copolymers, especially those which, besides the —$CH_2O$— repeat units, also have up to 50 mol %, preferably from 0.1 to 20 mol %, in particular from 0.3 to 10 mol %, and very particularly preferably from 0.2 to 2.5 mol %, of repeat units,

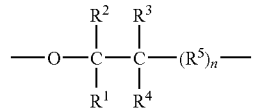

where $R^1$ to $R^4$, independently of one another, are a hydrogen atom, a $C_1$-$C_4$-alkyl group; or a halogen-substituted alkyl group having from 1 to 4 carbon atoms, and $R^5$ is a —$CH_2$—, —$CH_2O$—, $C_1$-$C_4$-alkyl- or $C_1$-$C_4$-haloalkyl-substituted methylene group or a corresponding oxymethylene group, and n is in the range from 0 to 3. These groups may be advantageously introduced into the copolymers by ring-opening of cyclic ethers. Preferred cyclic ethers have the formula

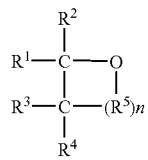

where $R^1$ to $R^5$ and n are as defined above. Mention may be made, merely as examples, of ethylene oxide, propylene 1,2-oxide, butylene 12-oxide, butylene 1,3-oxide, 1,3-dioxane, 1,3-dioxolane and 1,3-dioxepan as cyclic ethers, and also linear oligo- and polyformals, such as polydioxolane or polydioxepan as comonomers.

Other suitable components A) are oxymethylene terpolymers, prepared, for example, by reacting trioxane, one of the cyclic ethers described above and a third monomer, preferably bifunctional compounds of the formula

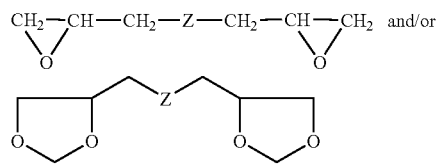

where Z is a chemical bond, —O—, —ORO— (R=$C_1$-$C_8$-alkylene or $C_3$-$C_8$-cycloalkylene).

Preferred monomers of this type are ethylene diglycide, diglycidyl ether and diethers made from glycidyl compounds and formaldehyde, dioxane or trioxane in a molar ratio of 2:1, and also diethers made from 2 mol of glycidyl compound and 1 mol of an aliphatic diol having from 2 to 8 carbon atoms, for example the diglycidyl ether of ethylene glycol, 1,4-butanediol, 1,3-butanediol, 1,3-cyclobutanediol, 1,2-propanediol or 1,4-cyclohexanediol, to mention merely a few examples.

Processes for preparing the homo- and copolymers described above are known to the person skilled in the art and described in the literature, and further details are therefore superfluous here.

The preferred polyoxymethylene copolymers have melting points of at least 160° C. to 170° C. (DSC, ISO 3146) and molecular weights (weight-average) Mw in the range from 5000 to 300 000, preferably from 7000 to 250 000 (GPC, PMMA standard).

Particular preference is given to end-group-stabilized polyoxymethylene polymers which have C—C bonds at the ends of the chains.

The polyoxymethylene moldings according to the invention can comprise up to 70%, preferably up to 50% by weight (based on 100% by weight of A) and B)) of other additives. Examples of suitable additives are talc, polyamides in particular copolyamides, alkaline earth metal silicates and alkaline earth metal glycerophosphates, esters or amides of saturated aliphatic carboxylic acids, ethers, which derive from alcohols and from ethylene oxide, non-polar polypropylene waxes, nucleating agents, fillers such as glass fibers, nanotubes, wollastonite, chalk, preferably with boric acid or with its derivatives as synergists, impact-modifying polymers, in particular those based on ethylene-propylene rubbers (EPM rubbers) or on ethylene-propylene-diene rubbers (EPDM rubbers) or on thermoplastic polyurethanes, flame retardants, plasticizers, coupling agents, dyes and pigments, further formaldehyde scavengers, which differ from D), or which are zeolites or polyethyleneimines, or melamine-formaldehyde condensates, antioxidants, in particular those having phenolic structure, benzophenone derivatives, benzotriazole derivatives, acrylates, benzoates, oxanilides and sterically hindered amines (HALS=hindered amine light stabilizers).

These additives are known and are described by way of example in Gächter/Müller, Plastics Additives Handbook, Hanser Verlag Munich, 4th edition, 1993, reprint 1996.

The amount of the additives depends on the additive used and on the desired effect. The conventional amounts are known to the person skilled in the art. If concomitant use is made of the additives, they are added in a conventional manner, for example, individually or together, undiluted, or in the form of a solution or suspension or preferably in the form of a masterbatch.

The finished POM molding composition can be prepared in a single step by, for example, mixing the POM and the additives in an extruder, kneader, or mixer or other suitable mixing apparatus, with melting of the POM, discharging the mixture, and then usually pelletizing the same. However, it has proven advantageous to begin by premixing some or all of the components "cold" in a dry-mixer or another mixing apparatus, and to homogenize the resultant mixture in a second step with melting of the POM—if appropriate with addition of further components—in an extruder or other mixing apparatus. It can in particular be advantageous at least to premix the POM and the antioxidant (if concomitant use is made of the same).

The extruder or the mixing apparatus can have devolatilization devices, for example in order to provide a simple method of removing residual monomers or other volatile constituents. The homogenized mixture is discharged as usual and preferably pelletized.

It is possible to design particularly mild conditions for addition of the additive, by minimizing the residence time between discharge from the devolatilization device and introduction into the mixing apparatus in which the additives are added. To this end, by way of example, the devolatilization vessel can be mounted directly on the intake of the extruder used for blending with the additives.

Polyoxymethylene moldings according to the invention comprise—as described above—the components A) and if appropriate, B), which have been coated with at least one binder C) and one formaldehyde scavenger D), where the binder C) used comprises at least one polyalkylene oxide $C_1$) or one vinyl ester $C_2$) or one graft polymer $C_3$) composed of $C_1$ and $C_2$) or a mixture of these.

The moldings according to the invention can be used in the form of chips, powder, micropowder, beads or lenticular granules, and preferably in the form of pellets.

Polyalkylene oxides may be mentioned as a first group of preferred binders $C_1$).

Examples of these are polyethylene glycols, which are non-ionic compounds of the general formula

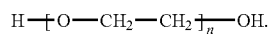

Polyethylene glycols are produced industrially via anionic ring-opening polymerization of ethylene oxide (oxiran) mostly in the presence of small amounts of water (or else sodium methoxide or alkali metal hydroxide). As a function of the conduct of the reaction, their molar masses are in the range from about 200 to 5 000 000 g/mol, corresponding to degrees of polymerization $P_n$, of from about 5 to >100 000. Products whose $P_n$=from 2 to 4 (diethylene glycol, triethylene glycol and tetraethylene glycol), are also counted as polyethylene glycols in the wider sense; they can be prepared with uniform molar mass, whereas the polyethylene glycols with higher molar masses are polydispersed. As a function of n, the substances produced take the form of soft pastes or of waxes.

Liquid products whose molar masses are about <25 000 g/mol are actually termed polyethylene glycols, abbreviated to PEG, while the higher-molar-mass solid materials (melting point about 65° C.) are termed polyethylene oxides, abbreviated to PEOX. High-molar-mass polyethylene oxides have an extremely low concentration of reactive hydroxy end groups and therefore exhibit only a low level of retained glycol properties. The term polyethylene glycols is also used for branched polyadducts of ethylene glycol on to polyhydric alcohols.

Polyethylene glycols are products taking the form of liquids or waxes to solids, and have good solubility in water up to about 100° C. and in many organic solvents. Aqueous solutions have remarkable rheological properties: various solutions sometimes exhibit a high level of viscoelasticity.

The average molar mass (calculated from the OH number to DIN 53240) is preferably from 100 to 15 000 g/mol, preferably from 150 to 10 000 g/mol, and the melting point is generally from −50 to 100° C., preferably from −40 to 80° C.

The kinematic viscosity to DIN 51562 at 20° C. is from 10 to 150 mm$^2$/s, preferably from 80 to 120 mm$^2$/s.

These products are obtainable from BASF Aktiengesellschaft with trademark Pluriol® E.

A further group of preferred binders $C_1$) is provided by polypropylene glycols of the general formula

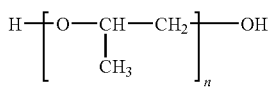

where $M_r$ is from 250 to 4000, the low-molar-mass representatives of these being miscible with water, whereas the higher-molar-mass polypropylene glycols in contrast are very sparingly soluble in water. Very high-molar-Mass polypropylene glycols are termed polypropylene oxides. Polypropylene glycols are produced via ring-opening polymerization of methyloxiran. As glycol ethers, they count as polyethers in the wider sense. The simplest representatives of the polypropylene glycols are di-, tri- and tetrapropylene glycol.

The average molar mass of preferred polypropylene glycols (calculated from the OH number) is from 200 to 10 000 g/mol, preferably from 400 to 5000 g/mol, and the kinematic viscosity is preferably from 50 to 2000 mm²/s, preferably from 80 to 1200 mm²/s at 20° C. to DIN 51562.

These products are obtainable commercially from BASF Aktiengesellschaft with trademark Pluriol® P.

Another preferred group of binders $C_1$) is provided by alkylpolyalkylene glycols, such as

| | |
|---|---|
| methylpolyethylene glycols | (Pluriol ® |
| $CH_3O(CH_2CH_2O)_nH$ | A . . . E grades) |
| butylpolypropylene glycols | (Pluriol ® |
| R—O[CH$_2$(CH$_3$)CHO]$_n$H | A . . . P grades) |
| butylpolyalkylene glycol copolymers | (Pluriol ® |
| R—O[(CH$_2$CH$_2$O)$_n$(CH$_2$(CH$_3$)CHO)]$_m$H | A . . . PE grades) |
| allyl- and butynediol polyalkylene glycols, | (Pluriol ® |
| and also tetramethyldecynediol | A . . . R grades) |
| allyl alcohol ethoxylate | (Pluriol ® |
| CH$_2$=CHCH$_2$O(CH$_2$CH$_2$O)$_n$H | A 010 R) |
| allyl alcohol alkoxylate | (Pluriol ® |
| CH$_2$=CHCH$_2$O[(CH$_2$CH$_2$O)$_n$(CH$_2$(CH$_3$)CHO)]$_m$H | A 23 R) |
| 2,4,7,9-tetramethyl-5-decyne-4,7-diol | (Pluriol ® |
| | A 104 R) |
| allyl alcohol alkoxylate capped with methyl end groups | (Pluriol ® |
| CH$_2$=CHCH$_2$O[(CH$_2$CH$_2$O)$_n$(CH$_2$(CH$_3$)CHO)]$_m$CH$_3$ | A 111 R) |
| butyne-1,4-diol polyethoxylate | (Pluriol ® |
| H(OCH$_2$CH$_2$)$_n$—OCH$_2$—C≡C—CH$_2$O—(CH$_2$CH$_2$O)$_n$H | A 308 R) |
| polyfunctional polyalkylene glycols based on | (Pluriol ® |
| trimethylolpropane or glycerol | A. TE grades) |

The hydroxy number to DIN 53240 is preferably from smaller than 3 to 1000 mg KOH/g, with preference from smaller than 3 to 800 mg KOH/g, the average molar masses being from 200 to 7000, with preference from 350 to 5000 g/mol.

It is, of course, also possible to use a mixture of above binders $C_1$).

The binder $C_2$) used, preferably comprises a polyvinyl ester, preference being given here to polyvinyl acetate and/or polyvinyl propionate.

Particular preference is given to polyvinyl acetates, obtainable via free-radical polymerization of vinyl acetate. The linkage of the monomers during buildup of the polymer chain takes place to a large extent (up to 98%) in the form of head-to-tail polymerization and only to a small extent in the form of head-to-head polymerization, and the characteristic fundamental units of the macromolecules of the polyvinyl acetates mainly comprise type I (head-to-tail) groups and comprise only a few type II (head-to-head) groups:

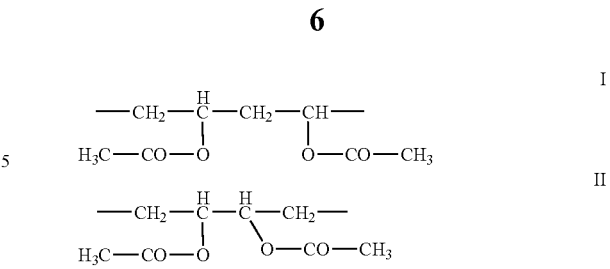

The polyvinyl acetates can be prepared by processes of bulk, solution, or suspension (bead) polymerization, or—preferred for industrial purposes—of emulsion polymerization. Molar masses of polyvinyl acetates are from 10 000 to 1 500 000 g/mol. They are amorphous products which have no odor or taste and have high lightfastness and weathering resistance, and are insoluble in water, but are soluble in many organic solvents (esters, ethers, ketones, halogenated hydrocarbons, etc.). The polyvinyl acetates are marketed in the form of powders, granules, or pellets or in the form of aqueous dispersions.

Preferred commercial products are obtainable from Wacker Polymer Systems GmbH & Co. KG with trademark Vinnapas®. The viscosity of these products is preferably from 1.0 to 60 mPa·s, preferably from 1.2 to 55 mPa·s (at 10% strength in ethyl acetate to DIN 53015 at 20° C.).

It is, of course, also possible to use a mixture of above binders $C_2$).

Graft polymers composed of $C_1$) and $C_2$) may be mentioned as a particularly preferred binder $C_3$), these being described by way of example in DE-A 10 77 430 and EP-A 219 048, which are expressly incorporated herein by way of reference.

These particularly feature narrow molar mass distribution and a polydispersity $M_w/M_n$ which is generally therefore ≦4, in particular ≦3, preferably ≦2.5. Their polydispersity $M_w/M_n$ is very particularly preferably in the range from 1.0 to 2.3. The polydispersity of the graft polymers can be determined by way of example via gel permeation chromatography using narrowly distributed polymethyl methacrylates as standard.

The average molecular weight $M_w$ of the graft polymers is from 3000 to 100 000, preferably from 6000 to 45 000 and particularly preferably from 7000 to 30 000.

The graft polymers preferably have a structure composed of
A) from 20 to 70% by weight of a water-soluble polyalkylene oxide and
B) from 30 to 80% by weight of a vinyl ester component composed of
  (B1) from 70 to 100% by weight of vinyl acetate and/or vinyl propionate and
  (B2) from 0 to 30% by weight of a further ethylenically unsaturated monomer.

They particularly preferably comprise from 25 to 60% by weight of component (A) and from 40 to 75% by weight of the polyvinyl ester component (B).

Water-soluble polyalkylene oxides suitable for forming the graft base (A) are in principle any of the polymers based on $C_2$-$C_4$-alkylene oxides which comprise at least 50% by weight, preferably at least 60% by weight, particularly preferably 75% by weight, of copolymerized ethylene oxide.

The polyalkylene oxides (A) preferably have low polydispersity $M_w/M_n$. Their polydispersity is preferably ≦1.5.

The polyalkylene oxides (A) can be the corresponding polyalkylene glycols in free form, i.e. having OH end groups, but they can also be those capped by end groups at one or both ends. Examples of suitable end groups are $C_1$-$C_{25}$-alkyl groups, phenyl groups, and $C_1$-$C_{14}$-alkylphenyl groups.

Individual examples that may be mentioned of particularly suitable polyalkylene oxides (A) are:

(A1) polyethylene glycols, one- or both ends of which can in particular have been end-capped by $C_1$-$C_{25}$-alkyl groups, but which have preferably not been etherified, their average molecular weights $M_n$ preferably being from 1000 to 20 000, particularly preferably from 2500 to 15 000;

(A2) copolymers of ethylene oxide and propylene oxide and/or butylene oxide whose ethylene oxide content is at least 50% by weight, one or both ends of which can likewise in particular have end capping by $C_1$-$C_{25}$ alkyl groups, but which have preferably not been etherified, their average molecular weights $M_n$ preferably being from 1000 to 20 000, particularly preferably from 2500 to 15 000;

(A3) chain-extended products whose average molecular weights are in particular from 2500 to 20 000, and which are obtainable via reaction of polyethylene glycols
 (A1) whose average molecular weights $M_n$ are from 200 to 5000 or of copolymers
 (A2) whose average molecular weights $M_n$, are from 200 to 5000 with $C_2$-$C_{12}$ dicarboxylic acids or with $C_2$-$C_{12}$ dicarboxylic esters or $C_6$-$C_{18}$ diisocyanates.

Preferred components (A) are the polyethylene glycols (A1).

The vinyl ester component (B) can advantageously be composed of (B1) vinyl acetate or vinyl propionate or of a mixture of vinyl acetate and vinyl propionate, and vinyl acetate is particularly preferred here as vinyl ester component (B).

However, the graft polymer can also be formed via copolymerization of vinyl acetate and/or vinyl propionate (B1) and of a further ethylenically unsaturated monomer (B2). The proportion of the monomer (B2) in the vinyl ester component (B) can be up to 30% by weight here, corresponding to 24% by weight content of (B2) in the graft polymer.

Examples of suitable comonomers (B2) are monoethylenically unsaturated carboxylic acids and dicarboxylic acids and derivatives of these, e.g. esters, amides and anhydrides, and styrene. It is, of course, also possible to use a mixture of various comonomers.

Individual examples that may be mentioned are: (meth)acrylic acid, $C_1$-$C_{12}$-alkyl and hydroxy-$C_2$-$C_{12}$-alkyl esters of (meth)acrylic acid, (meth)acrylamide, N—$C_1$-$C_{12}$-alkyl (meth)acrylamide, N,N-di($C_1$-$C_6$-alkyl)(meth)acrylamide, maleic acid, maleic anhydride and mono($C_1$-$C_{12}$-alkyl)esters of maleic acid.

Preferred monomers (B2) are the $C_1$-$C_8$-alkyl esters of (meth)acrylic acid and hydroxyethyl acrylate, particular preference being given here to the $C_1$-$C_4$-alkyl esters of (meth)acrylic acid.

Very particularly preferred monomers (B2) are methyl acrylate, ethyl acrylate and especially n-butyl acrylate.

If the graft polymers according to the invention comprise the monomers (B2) as constituent of the vinyl ester component (B), the content of (B2) in the graft polymers is then preferably from 0.5 to 20% by weight, particularly preferably from 1 to 15% by weight and very particularly preferably from 2 to 10% by weight.

For preparation processes and further details concerning these graft polymers DE-A 10 77 430 and EP-A 219 048 are expressly incorporated herein by way of reference.

For the coating of the POM moldings, the binder C) is used in combination with an FA scavenger D), and the FA scavenger used here comprises at least one lysine compound.

Preferred lysine compounds are both stereoisomers of this amino acid, which occur with and without bound water:

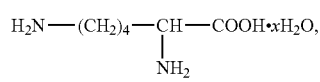

where $x = 0$ or $1$ other preferred compounds D) are

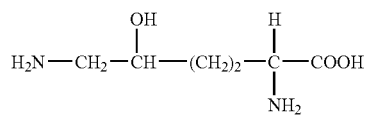

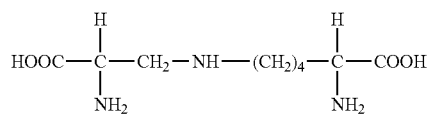

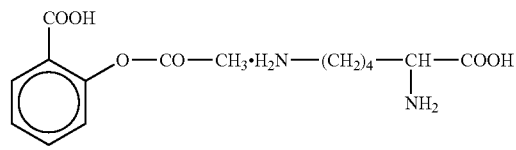

Preparation processes are known to the person skilled in the art, and no further details need therefore be given here.

According to the invention, the coated POM moldings are obtained by preparing in advance a solution, emulsion or dispersion from components C) and D), and then applying this to the POM moldings, and drying the material.

A solution composed of the binder C) and of the FA scavenger D) is preferred. A particularly suitable solvent for $C_1$) is water, whereas $C_2$) is mostly insoluble in water. Suitable solvents for $C_2$) are organic solvents, such as ketones, ethers, esters or halogenated hydrocarbons, preference being given here to ketonic solvents, in particular acetone.

These solutions comprise, based on 100% by weight of all of the constituents of the solution, from 0.1 to 30% by weight, preferably from 1 to 20% by weight and in particular from 1 to 15% by weight of respectively C) and D) and also optionally from 0 to 10% by weight, preferably up to 5% by weight, of a pigment E).

One preferred example of these additives is bone char, obtainable by way of example from calcined or ground bones of animals. Appropriate comminution and post, treatment of crude animal charcoals can give products which have various color intensities and particle sizes.

The constitution of conventional bone char is generally approximately as follows:
from 85 to 90% by weight of calcium phosphate
from 7.5 to 12% by weight of carbon
1.5% by weight of water.

pH is generally in the range from 7 to 9, in particular from 7.5 to 8.5 and density is generally in the range from 1.8 to 3.0 g/cm$^3$, preferably from 2.1 to 2.5 g/cm$^3$.

An example of bone chars suitable for the inventive molding compositions is obtainable from Hoover Color Corporation as "Bone Black".

Principal products suitable as carbon black are those described by way of example in Encyclopedia of Chemical Technology, Vol. 3, pp. 34 ff (Interscience Encyclopedia, New York).

Further suitable pigments are iron oxide black (Fe$_3$O$_4$), spinel black (Cu(Cr$_1$Fe)$_2$O$_4$) and manganese black (a mixture of manganese dioxide, silicon dioxide and iron oxide). Copper phthalocyanine pigments can also be used.

Suitable red pigments are those marketed by BASF Aktiengesellschaft with trademark Paliogen® Red, an example being known design (see, for example, K. Maters: Spray Drying Handbook, Leonard Hill Books, London 1972). The solvent can be evaporated either at atmospheric pressure or else in vacuo. The heat needed here to evaporate the solvent is preferably introduced at the top of the tower via an inert drying gas. A particularly suitable drying gas is nitrogen. However, other gases can also be used, for example, carbon dioxide or air. The gas temperature at the top of the drying tower is preferably higher than the evaporation temperature of the solvent, and can be from room temperature to 500° C. It is generally 100° C. or above. It is preferably in the range from 200° C. to 300° C.

It is preferable that the drying gas flows together with the liquid droplets through the drying tower and is removed by suction at the outlet of the tower together with the drying product. The gas temperature at the outlet of the tower depends on the desired residual solvent content of the powder. It can be from room temperature to just below the gas temperature at the head of the drying tower. It is generally 50° C. or above, for example from 120° C. to 170° C. Temperatures above 200° C. are not generally required.

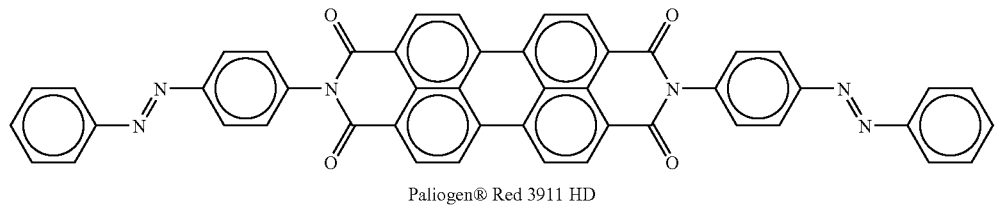

Paliogen® Red 3911 HD from 0.05 to 5% by weight, preferably from 0.1 to 3% by weight and in particular 0.2 to 2% by weight of the solution (≙100% by weight) obtained as above is then applied to the POM moldings (1 kg).

The temperature is preferably from room temperature to 60° C., preferably from room temperature to 50° C.

The solutions which are at room temperature are generally atomized (spray technology). In order to reduce their viscosity, it can be necessary to spray the solutions at an elevated temperature. The atomizing temperatures are, however, generally below the boiling point of the respective solvent.

For the atomization process, pneumatic atomizers can be used, examples being multi-fluid nozzles, in particular twin-fluid nozzles. Examples of these that may be mentioned are dual- or triple-flow twin-fluid nozzles. In order to generate a rotary motion or to deflect the flow, the twin-fluid nozzles can comprise internals. These can have been attached either on the gas side or on the liquid side. It is also possible to use ultrasound atomizers.

The ratio of atomizer gas throughput by weight to liquid throughput by weight is generally greater than 2. Particularly advantageous ratios of atomizer gas throughputs to liquid throughputs have proven to be from 3 to 10. Gas pressures of 5 bar or more are generally required. Gas pressure of more than 100 bar is seldom necessary. The gas pressures are generally from 10 to 70 bar.

After the atomization process, the liquid droplets can be dried in a drying chamber, for example, in a spray tower of The powder can generally be isolated conventionally from the gas stream, via filters or cyclones. It is preferable to use filters to isolate the solid for the production of the inventive POM moldings.

Without after-drying, the residual solvent content of the POM moldings is generally not more than 5%, in particular less than 2%. In order to achieve a further reduction in the residual solvent content, after-drying, possibly in combination with after-cooling, can be carried out downstream of the spray-drying process. The after-drying can, by way of example, take place in a fluidized bed or moving bed.

After the drying process, the moldings comprise, based on 100% by weight of all of the components A, B, C and D, from 0.01 to 0.3% by weight, preferably from 0.02 to 0.2% by weight, of C and from 0.01 to 0.3% by weight, preferably from 0.02 to 0.2% by weight, of D.

Moldings (including semi finished products, foils, films and foams) of any type can be produced form the molding compositions. The molding compositions feature very low residual formaldehyde content together with good mechanical properties and processing, and also together with thermal stability. In particular, very small amounts of the additives can be applied as coating, while effectiveness as FA scavenger is comparable or better (better distribution and good adhesion).

Moldings composed of these molding compositions are particularly suitable for applications as pushbuttons, recessed grips, sunroof frames, loudspeaker grilles, sanitary fittings, video cassettes, toy components, window accessories, door furniture, clips, fasteners, snap connectors, ball sockets, tank insert components, gearwheels, guiding elements, conveyer belts, conveyer systems, spray valves, brewing units for espresso machines, coffee machines, articulated joints, rollers, bearings, slide rails, pump components, and filter housings, drive systems, springing elements and locking elements, bobbins, diverter rollers, gearbox components, and pendulum supports.

EXAMPLES

The components used were as follows:
Component A/1
Polyoxymethylene copolymer comprising 97.3% by weight of trioxane and 2.7% by weight of butanediol formal. The product still comprised about 3% by weight of unconverted trioxane and 5% by weight of thermally unstable fractions. After degradation of the thermally unstable fractions, the melt volume rate of the copolymer was 7-8 cm$^3$/10 min. (190° C., 2.16 kg, to ISO 1133).
Component A/2
POM copolymer whose MVR is from 1.8 to 2.6 ml/10 min. (190° C., 2.16 kg to ISO 1133).
Component B/3
POM copolymer whose MVR is from 5.7-8.3 ml/10 min. (190° C., 2.16 kg to ISO 1133).
Component B/1
Loxiol® P 1206 from Cognis (glycerol distearate)
Component B/2
Melamine-formaldehyde condensate (MFK) according to example 1 of DE-A 125 40 207.
Component B/3
(Irganox® 245 from Ciba-Geigy)

To produce the molding compositions, component A) was mixed with the stated amount of components B) in a dry-mixer at a temperature of 23° C. The resultant mixture was introduced into a twin-screw extruder with devolatilization device (ZSK 30 or ZSK 53 from Werner & Pfleiderer), homogenized at 230° C., devolatilized, and the homogenized mixture was discharged from the extruder die in the form of a strand and pelletized or was pelletized under water through a die to give material of bead/lenticular shape.

| Pellets 1: Component A/1 | Pellets 2: Component A/1 |
|---|---|
| 0.15% by wt. B/1 | 0.15% by wt. B/1 |
| 0.2% by wt. B/2 | 0.2% by wt. B/2 |
| 0.35% by wt. B/3 | 0.35% by wt. B/3 |
| 0.04% by wt. B/4 | 0.04% by wt. B/4 |
| 0.05% by wt. B/5 | 0.05% by wt. B/5 |
|  | 0.25% by wt. B/6 |

| Pellets 3: Component A/2 | Pellets 4: Component A/3 |
|---|---|
| 0.1% by wt. B/1 | 0.3% by wt. B/1 |
| 0.2% by wt. B/2 | 0.2% by wt. B/2 |
| 0.35% by wt. B/3 | 0.35% by wt. B/3 |
| 0.04% by wt. B/4 | 0.04% by wt. B/4 |
| 0.05% by wt. B/5 | 0.05% by wt. B/5 |
| 0.25% by wt. B/6 | 0.1% by wt. B/7 |
|  | 12% by wt. B/8 |

Component C
$C_{31}$:
Graft polymer composed of
30.8% by weight of PEG whose molar mass is 4000 g/mol
69.2% by weight of PVA HO—[3-tert-butyl-5-methylphenyl]—CH$_2$—CH$_2$—C(=O)—O—CH$_2$—CH$_2$—O—CH$_2$—CH$_2$—O—CH$_2$—CH$_2$—O—C(=O)—CH$_2$—CH$_2$—[3-tert-butyl-5-methylphenyl]—OH Component B/4
Polyamide oligomer whose molar mass is about 3000 g/mol, (as molar-mass regulator) prepared from caprolactam, hexamethylenediamine, adipic acid and propionic acid by a method based on examples 5-4 of U.S. Pat. No. 3,960,984 ("PA-dicapped").
Component B/5
Synthetic Mg silicate (Ambosol® from PQ France) with the following properties:
Content of MgO ≧14.8% by weight
Content of SiO$_2$≧59% by weight
SiO$_2$:MgO ratio 2.7 mol/mol
Bulk density from 20 to 30 g/100 ml
Loss on ignition <25% by weight
Component B/6
Carbon black (Printex® 90 from Degussa AG)
Component B/7
Magnesium trisilicate
Component B/8
Thermoplastic polyurethane whose Shore A hardness is 83 (Elastollan® B 85 A from Elastogran GmbH).

Component D/1
L-Lysine $H_2N—(CH_2)_4—CH(NH_2)—COOH$,

Component D/2
L-Lysine monohydrate
Pigment E
Paliogen® Red 3911 HD (CAS No. 3049-71-6) from BASF AG.
Production of Solutions and Coatings
10% by weight of binder $C_{31}$ were dissolved in water at from 60 to 70° C.
Amounts of 10% by weight of the FA scavenger D/1 or D/2 were added and stirred until a clear solution was produced. 3% by weight of pigment E) were optionally added to the solution.
1% by weight of this solution was added on to a disk rotating at high speed in a centrifuge. The centrifuge comprised (under $N_2$) the respective POM pellets, which were coated with the solution by centrifugal force. The residence time was about 30 s. The centrifuge continued to run for 5 minutes and the pellets were removed. They were dried at 80° C. in vacuo in an oven. Dispersion and adhesion were assessed visually on the dried pellets. Formaldehyde emission was determined to VDA 275.

The following components were used in accordance with the above procedure:

Example 1

Pellets 1, $C_{31}$, D/2, E

Example 2

Pellets 1, $C_{31}$, D/1, E

Example 3

Pellets 4, $C_{31}$, D/2, E

Example 4

Pellets 4, $C_{31}$, D/1, E

Example 5

Pellets 2, $C_{31}$, D/2

Example 6

Pellets 2, $C_{31}$, D/1

Example 7

Pellets 3, $C_{31}$, D/2

Example 8

Pellets 3, $C_{31}$, D/1

The table gives the results of the measurements.

TABLE

| Example | Distribution | Adhesion | FA [ppm] |
|---|---|---|---|
| 1 | ++ | ++ | 11 |
| 2 | ++ | ++ | 3 |
| 3 | ++ | ++ | 7 |
| 4 | ++ | ++ | 8 |
| 5 | ++ | ++ | 7 |
| 6 | ++ | ++ | 9 |
| 7 | ++ | ++ | 14 |
| 8 | ++ | ++ | 14 |

++ means: very good
+ means: good
− means: poor

The invention claimed is:

1. A coated polyoxymethylene (POM) molding, comprising at least one polyoxymethylene homo- or copolymer A), and also, optionally, additives B), which has been coated on the surface with at least one binder C) and one formaldehyde scavenger D), wherein the binder C) comprises a graft polymer $C_3$ composed of a polyalkylene oxide $C_1$ and of a polyvinyl ester $C_2$, and the formaldehyde scavenger D) used comprises at least one lysine compound.

2. The POM molding according to claim 1, which is composed of chips, pellets, powder, micropowder, beads, lenticular granules or a mixture of these.

3. The POM molding according to claim 2, wherein the formaldehyde scavenger D) comprises lysine compounds of the following structure or a mixture of these:

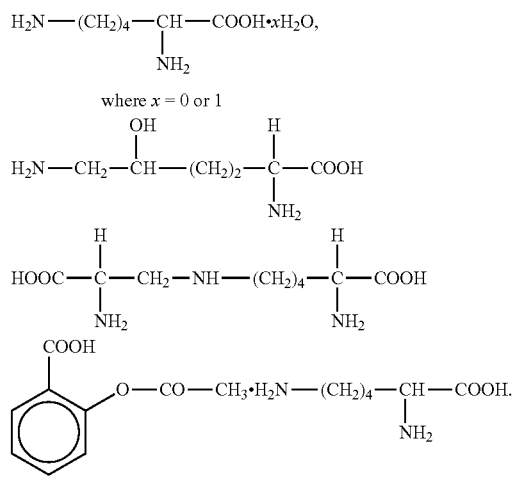

4. The POM molding according to claim 2, wherein the binder C comprises a graft polymer which is composed of $C_1$ and $C_2$, and whose structure is composed of
A) from 20 to 70% by weight of a water-soluble polyethylene oxide and
B) from 30 to 80% by weight of a vinyl ester component composed of
B1) from 70 to 100% by weight of vinyl acetate and/or vinyl propionate and
B2) from 0 to 30% by weight of a further ethylenically unsaturated monomer.

5. A process for the production of coated POM moldings according to claim 2, which comprises preparing in advance a solution, emulsion or dispersion from components C) and D), and then applying this to a polyoxymethylene, and drying the material.

6. The POM molding according to claim 1, wherein the formaldehyde scavenger D) comprises lysine compounds of the following structure or a mixture of these:

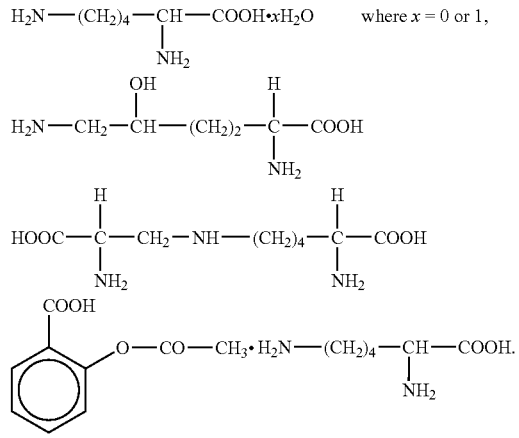

7. The POM molding according to claim 6, wherein the binder C comprises a graft polymer which is composed of $C_1$ and $C_2$, and whose structure is composed of
   A) from 20 to 70% by weight of a water-soluble polyethylene oxide and
   B) from 30 to 80% by weight of a vinyl ester component composed of
      B1) from 70 to 100% by weight of vinyl acetate and/or vinyl propionate and
      B2) from 0 to 30% by weight of a further ethylenically unsaturated monomer.

8. A process for the production of coated POM moldings according to claim 6, which comprises preparing in advance a solution, emulsion or dispersion from components C) and D), and then applying this to a polyoxymethylene, and drying the material.

9. The POM molding according to claim 1, wherein the binder C comprises a graft polymer which is composed of $C_1$ and $C_2$, and whose structure is composed of
   A) from 20 to 70% by weight of a water-soluble polyethylene oxide and
   B) from 30 to 80% by weight of a vinyl ester component composed of
      B1) from 70 to 100% by weight of vinyl acetate and/or vinyl propionate and
      B2) from 0 to 30% by weight of a further ethylenically unsaturated monomer.

10. A process for the production of coated POM moldings according to claim 9, which comprises preparing in advance a solution, emulsion or dispersion from components C) and D), and then applying this to a polyoxymethylene, and drying the material.

11. A process for the production of the coated POM molding according to claim 1, which comprises preparing in advance a solution, emulsion or dispersion from components C) and D), and then applying this to a polyoxymethylene, and drying the material.

12. The process according to claim 11, wherein an aqueous or acetonic solution is prepared from C) and D).

13. The process according to claim 12, wherein up to 10% by weight of a pigment E) is also added to the solution composed of C) and D).

14. The process according to claim 12, wherein the coating composed of C) and D) is applied by means of spray technology.

15. The process according to claim 12, wherein the coating is applied at from room temperature to 60° C.

16. The process according to claim 11, wherein up to 10% by weight of a pigment E) is also added to the solution composed of C) and D).

17. The process according to claim 16, wherein the coating composed of C) and D) is applied by means of spray technology.

18. The process according to claim 16, wherein the coating is applied at from room temperature to 60° C.

19. The process according to claim 11, wherein the coating composed of C) and D) is applied by means of spray technology.

20. The process according to claim 11, wherein the coating is applied at from room temperature to 60° C.

* * * * *